United States Patent
Kulis, Jr. et al.

(10) Patent No.: US 6,860,368 B2
(45) Date of Patent: Mar. 1, 2005

(54) HIGH FRICTION BRAKE SHOE ASSEMBLY

(75) Inventors: Stanley Frank Kulis, Jr., White Post, VA (US); Craig Robert Cook, Winchester, VA (US); David Douglas Muffley, Clear Spring, MD (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 58 days.

(21) Appl. No.: 10/336,080

(22) Filed: Jan. 3, 2003

(65) Prior Publication Data

US 2004/0129513 A1 Jul. 8, 2004

(51) Int. Cl.$^7$ .............................................. F16D 65/04
(52) U.S. Cl. ............................. 188/250 B; 188/250 G; 188/234
(58) Field of Search ............................. 188/234, 250 G, 188/250 B, 247

(56) References Cited

U.S. PATENT DOCUMENTS

| | | | |
|---|---|---|---|
| 1,202,529 A | 10/1916 | Jones | |
| 1,336,752 A | * 4/1920 | Muller | ................... 188/234 |
| 1,532,141 A | 4/1925 | Kenyon | |
| 1,592,273 A | * 7/1926 | Kelly | ................... 188/250 B |
| 1,781,074 A | 11/1930 | Norton | |
| 1,880,750 A | 10/1932 | Brackett | |
| 4,569,424 A | 2/1986 | Taylor, Jr. | |
| 4,799,579 A | 1/1989 | Myers et al. | |
| 4,924,583 A | 5/1990 | Hummel et al. | |
| 4,991,697 A | 2/1991 | Hummel et al. | |
| 5,141,083 A | 8/1992 | Burgoon | |
| 5,355,986 A | 10/1994 | Biswas | |
| 5,695,026 A | * 12/1997 | Redgrave et al. | ....... 188/250 D |
| 5,732,800 A | 3/1998 | Spigener | |
| 6,279,222 B1 | 8/2001 | Bunker et al. | |
| 6,367,600 B1 | 4/2002 | Arbesman | |

* cited by examiner

*Primary Examiner*—Matthew C. Graham
(74) *Attorney, Agent, or Firm*—Howard & Howard

(57) ABSTRACT

A vehicle brake shoe assembly having a brake shoe platform incorporating a plurality of extensions which project through the brake friction material matrix to the outer friction surface of the brake shoe assembly. Each extension is configured to cooperate with the brake friction material matrix to engage a surface of an opposing friction element, increasing the static and dynamic friction performance of the assembly beyond that achieved from the engagement of the brake friction material matrix and the surface of the opposing friction element alone.

9 Claims, 3 Drawing Sheets

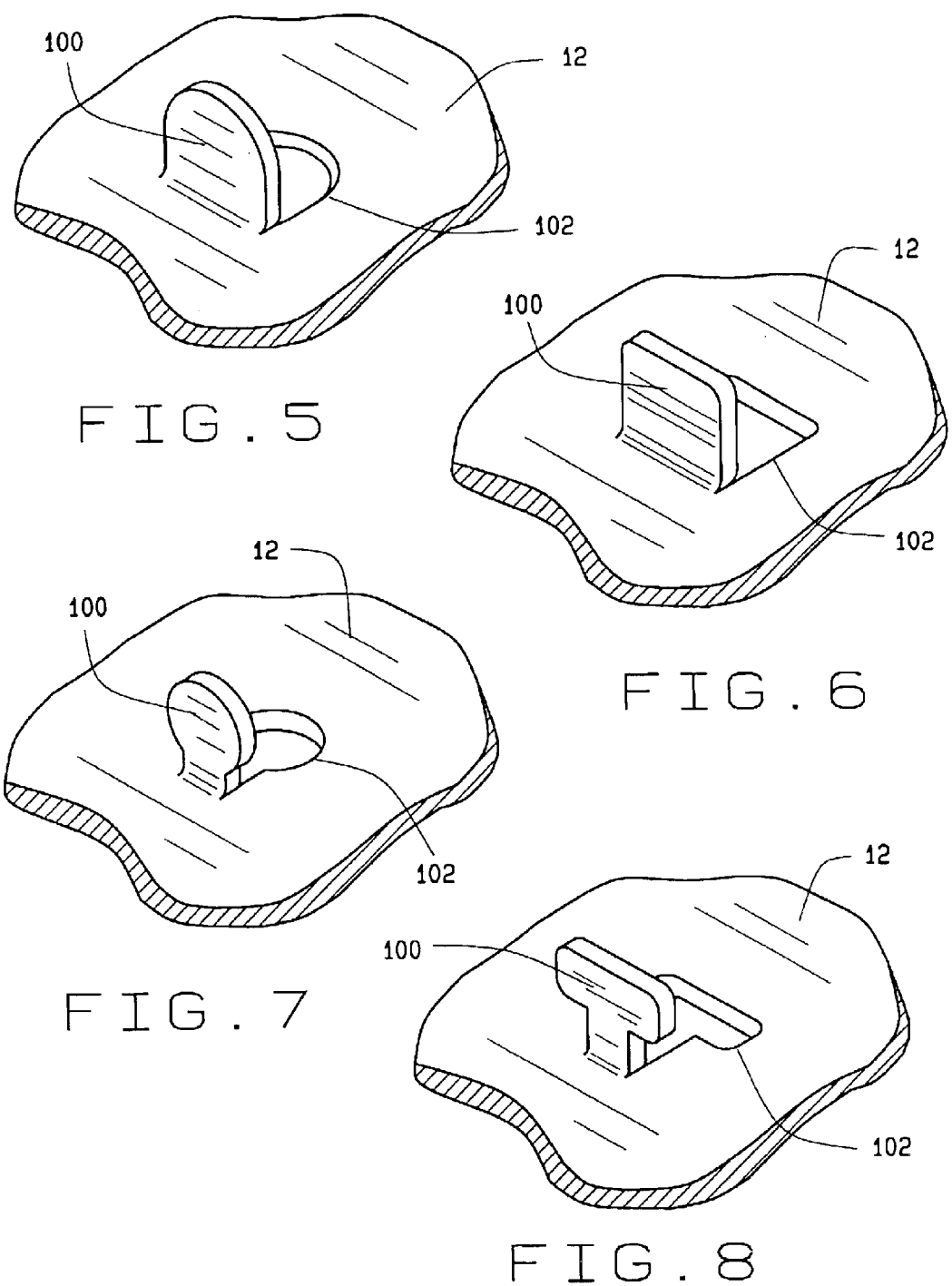

HIGH FRICTION BRAKE SHOE ASSEMBLY

CROSS-REFERENCE TO RELATED APPLICATIONS

None.

STATEMENT REGARDING FEDERALLY SPONSORED RESEARCH

Not Applicable.

BACKGROUND OF THE INVENTION

The present invention relates generally to vehicle brake shoe assemblies, and in particular, to a high friction drum-in-hat brake shoe assembly incorporating a plurality of carrier plate extensions through a friction material matrix, to be utilized in vehicle parking brakes and vehicle emergency braking systems on vehicle equipped with four wheel disc brakes.

Vehicle drum type friction brakes commonly include a vehicle brake shoe assembly carrying a frictional matrix which is brought into contact with an inner cylindrical surface of a rotating brake drum to generate a frictional force and correspondingly slow, stop, or hold the vehicle in a stationary or parked position.

Variations between the curvature of the brake shoe assembly and the curvature of the inner cylindrical surface of the rotating brake drum can alter the frictional effectiveness of a drum type friction brake. For example, if the friction level generated by a drum type friction brake is too low due to regions of the frictional matrix which are not in contact with the opposing friction surface of the brake drum, the brake will not function to the required level of static effectiveness, i.e. parking brake capability. One method commonly utilized to overcome this type of static friction problem is to bring the vehicle to a stop a number of times using only the parking brake or emergency brake, thereby generating excessive frictional forces on those portions of the brake shoe assembly in contact with the rotating brake drum, and wearing or abrading them into closer conformance with the curvature of the rotating brake drum. Such methods can cause premature failure or excessive wear on the brake components.

Alternatively, frictional braking forces are increased in vehicle drum type friction brakes by producing a rough or sandblasted friction surface on the brake drum which is engaged by the brake shoe assembly. This process, while increasing the frictional braking forces may, reduced the amount of friction material, shortening the lifespan of the brake components such as the brake friction material matrix.

The use of carrier plate extensions, nubs or teeth, which are completely contained within, and engage with, the brake friction material matrix on brake shoe assemblies has been previously employed to facilitate the attachment and inter-locking of the brake friction material matrix to the carrier plate. See, for example, U.S. Pat. No. 6,367,600 B1 to Arbesman and U.S. Pat. No. 6,279,222 B1.

Another example of the use of projecting nubs or teeth is seen in U.S. Pat. No. 4,569,424 to Taylor, Jr., where an improved brake shoe assembly is provided. A friction material matrix in the '424 Taylor, Jr. reference is molded directly onto a brake liner plate which includes a plurality of perforations forming protruding tabs. The inter-engagement between the molded friction material and the perforated areas and tabs provides an enhanced interlocking strength between these elements. The '424 Taylor, Jr. reference, specifically teaches that it is undesirable for the protruding tabs to extend so far as to reach the outer surface of the friction material matrix, and indicate that the brake shoe assembly has reached the end of a useful service life when sufficient friction matrix material has been worn away so as to expose the protruding tabs.

Accordingly, there is a need in the automotive brake systems design area for a parking brake or emergency brake shoe assembly with enhanced static and dynamic frictional properties, and which does not require an initial wear or break-in period to improve conformance between the frictional matrix and the opposing frictional surface of the brake drum.

BRIEF SUMMARY OF THE INVENTION

Briefly stated, the present invention is a vehicle brake shoe assembly having a brake shoe platform incorporating a plurality of extensions which project through the brake friction material matrix to the friction surface of the brake shoe assembly. Each of the extensions is configured to cooperate with the brake friction material matrix to engage a surface of an opposing friction element, increasing the static and dynamic friction performance of the assembly beyond that achieved from the engagement of the brake friction material matrix and the surface of the opposing friction element alone.

In an alternate embodiment of the vehicle brake shoe assembly of the present invention, the brake shoe platform incorporates a plurality of extension which project through the brake friction material matrix and protrude above the friction surface of the brake shoe assembly.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 5 is an enlarged view of a second alternate configuration of a projection formed in the brake shoe platform;

FIG. 6 is an enlarged view of a third alternate configuration of a projection formed in the brake shoe platform;

FIG. 7 is an enlarged view of a fourth alternate configuration of a projection formed in the brake shoe platform;

FIG. 8 is an enlarged view of a fifth alternate configuration of a projection formed in the brake shoe platform;

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
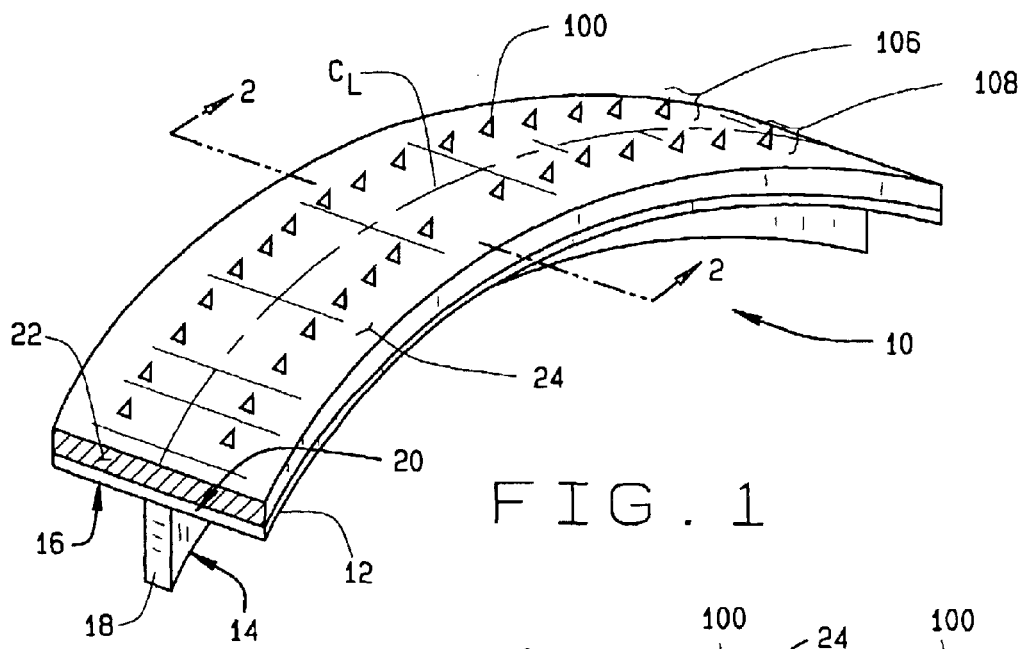
FIG. 1 is a perspective view of a brake shoe assembly of the present invention.

Turning to FIG. 1 a brake shoe assembly of the present invention is shown generally at 10. The brake shoe assembly 10 comprises a cylindrically curved brake shoe platform 12 defining a portion of a cylinder surface. The brake shoe assembly 10 is configured with one or more attachment points 14 on a lower surface 16 adapted to facilitate attachment of the brake shoe assembly 10 to a supporting structure on a motor vehicle wheel (not shown). The specific features of the attachment points 14 vary depending upon the particular application for which the brake shoe assembly 10 is intended.

For example, the attachment points 14 may consist of a raised web 18 extending circumferentially along the lower surface 16, one or more protruding threaded bosses (not shown), or bores (not shown) through which retaining pins are placed. The brake shoe platform 12 further includes an upper surface 20 configured to receive a brake friction material matrix 22. The radially outermost surface of the brake friction material matrix 22 defines an outer friction surface 24.

Figure 2:
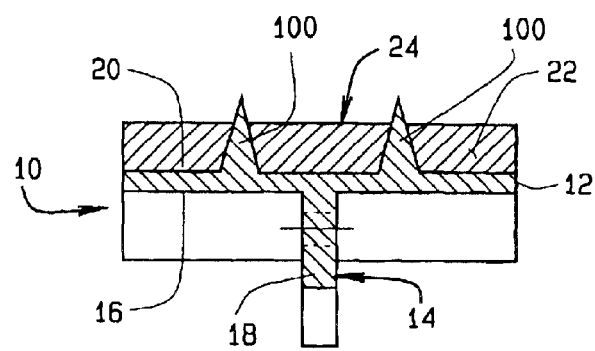
FIG. 2 is a sectional view of the brake show assembly of FIG. 1, taken at line 2—2.

As can be seen in FIGS. 1 and 2, a plurality of extensions 100 project radially outward from the upper surface 20 of the brake shoe platform 12. Each of the plurality of extensions 100 passes through the brake friction material matrix 22, and terminates in a first embodiment at the outer friction surface 24. In an alternate embodiment, each of the plurality of extensions 100 terminates radially outward from the outer friction surface 24, exposing a protruding portion.

Figure 3:
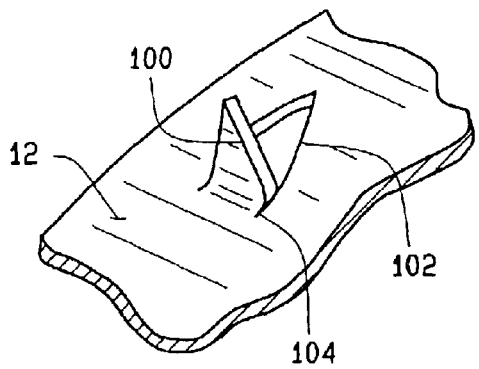
FIG. 3 is an enlarged view of a projection of the present invention formed in the brake shoe platform.
Figure 4:
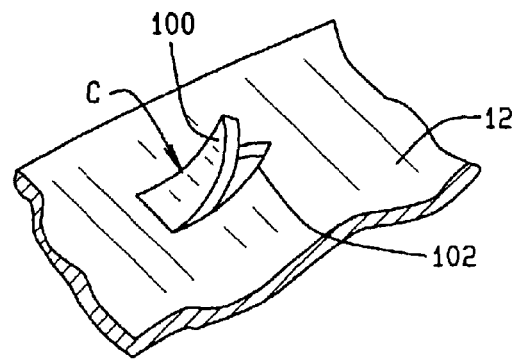
FIG. 4 is an enlarged view of a first alternate projection of the present invention formed in the brake shoe platform.

Preferably, as shown in FIG. 3, each projecting extension 100 is integrally formed as a punch-out from the brake shoe platform 12. Each integral projecting extension may be formed by cutting the brake shoe platform 12 along a segment 102 in a manner such that no material is separated from the brake shoe platform, with the ends of each segment 102 aligned parallel to an axis of the cylinder defined by the curvature of the brake shoe platform. Each projecting extension 100 is formed by bending the material within the cut radially outward to a desired angular orientation from the outer surface of the brake shoe platform, along a bending axis 104 between each end of segment 102. Alternatively, each projecting extension 100 may be formed by bending the material of the brake shoe platform defining the extension 100 in a smooth curve C, as seen in FIG. 4, rather than bending only along a bending axis 104 between the ends of segment 102.

Those of ordinary skill in the art will readily recognize that a variety of methods may be employed to form and secure the projecting extensions 100 to the brake shoe platform 12, to achieve the desired result of the projecting extensions passing radially outward through the friction material matrix 22. For example, individual extensions 100 could be manufactured separate from the brake shoe platform 12, and welded or secured to the brake shoe platform.

Those of ordinary skill in the art will further recognize that the projecting extensions 100 need not be limited to the triangular configuration shown in FIGS. 1–4. For example, as shown in FIG. 5 through FIG. 8, exemplary alternative configurations such as rounded tabs, rectangles, keyholes, and T-shapes may be utilized for projecting extensions 100.

Preferably, as seen in FIG. 1 the projecting extensions 100 are arranged in two parallel circumferential rows 106, 108 on either side of a circumferential centerline $C_L$ of the cylindrically curved brake shoe platform 12.

Figure 9:
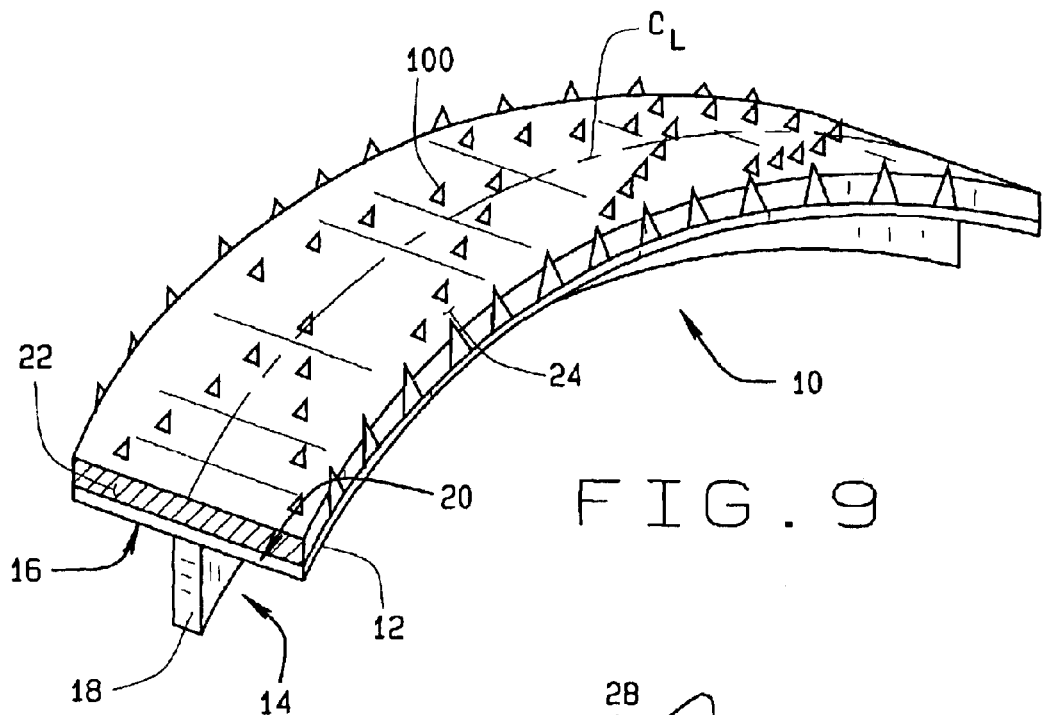
FIG. 9 is a perspective view of a brake shoe assembly of an alternate configuration of the present invention.

In a first alternative configuration, the projecting extensions 100 may be symmetrically disposed about the circumferential centerline $C_L$ of the cylindrically curved brake shoe platform 12. For example, as seen in FIG. 9, the projecting extensions 100 may define one or more "V" patterns on the upper surface 20 of the brake shoe platform 12. If only one "V" pattern is defined by the projecting extensions 100, each projecting extension 100 may be disposed within a unique circumferential arc on the upper surface 20 of the brake shoe platform 12. Also shown in FIG. 9, the projecting extensions 100 may be disposed on the upper surface 20 such that they are on the outer edges of the brake shoe platform 12.

In a second alternative configuration, the projecting extensions 100 may be randomly disposed on of the cylindrically curved brake shoe platform 12.

Figure 10:
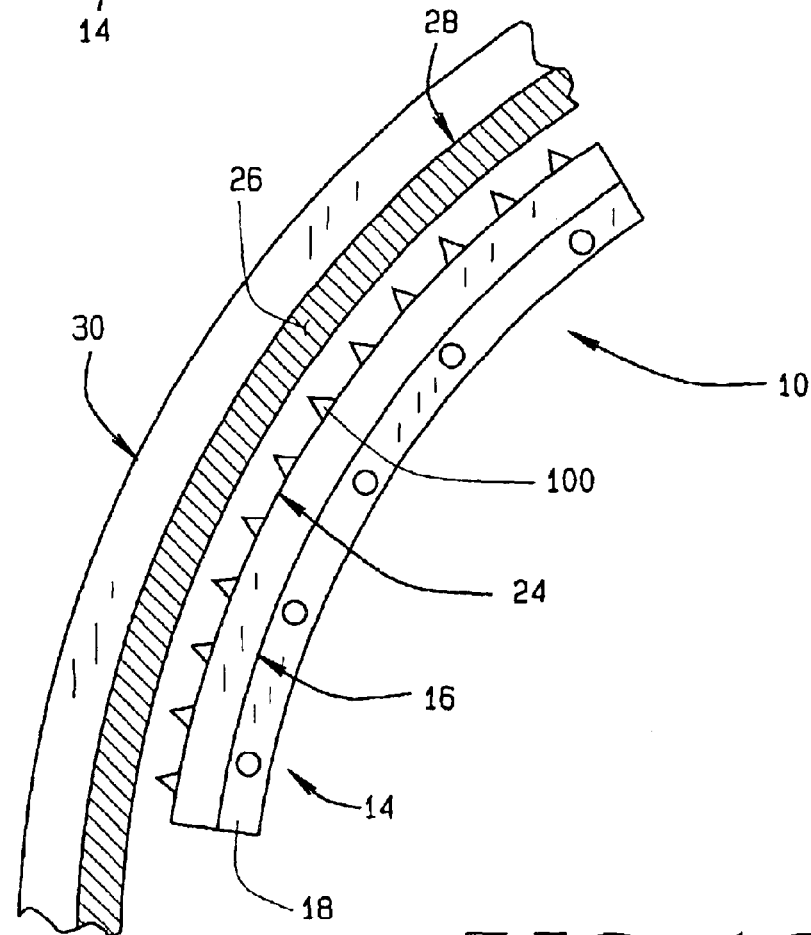
FIG. 10 is a side view of a brake shoe assembly of the present invention in operative relationship to a brake drum surface.

As seen in FIG. 10, during operating of a vehicle braking system, the brake shoe assembly 10 is actuated in a conventional manner to move the outer friction surface 24 and projecting extensions 100 into contact with an opposing friction surface 26, if present on an inner cylindrical surface 28 of a co-axially mounted brake drum 30, or directly against the inner cylindrical surface 28. Operation of the vehicle braking system when the vehicle is stationary, i.e. application of the parking brake, results in the outer friction surface 24 and projecting extensions 100 being moved into stationary contact with the opposing friction surface 26. This results in an initial static friction (green friction) force which must be overcome before the brake drum 30, and opposing friction surface 26, can rotate relative to the brake shoe assembly 10 and outer friction surface 24.

Operation of the vehicle braking system when the vehicle is in motion, i.e. application of an emergency brake, results in the outer friction surface 24 and projecting extensions 100 being moved into rotational or sliding contact with the opposing friction surface 26. This results in a dynamic frictional force at the contacting friction surfaces and projecting extensions 100, acting to reduce the relative rotation between the brake drum 30 and the brake shoe assembly 10.

In view of the above, it will be seen that the objectives of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. An improved brake shoe assembly having a cylindrically curved brake shoe platform defining a portion of a cylinder, an inner supporting surface and an outer supporting surface and a brake friction material matrix disposed on the outer supporting surface of the brake shoe platform, the brake friction material matrix defining a friction surface, wherein the improvement comprises:

a plurality of extensions projecting from said brake shoe platform outer supporting surface through said brake friction material to said friction surface, and wherein each of said plurality of extensions terminates above said friction surface.

2. The improved brake shoe assembly of claim 1 wherein said plurality of extensions are randomly disposed on said cylindrically curved brake shoe platform.

3. The improved brake shoe assembly of claim 1 wherein each of said plurality of extensions is integrally formed with said cylindrically curved brake shoe platform.

4. The improved brake shoe assembly of claim 1 wherein each of said plurality of extensions includes a base oriented parallel to an axis of the cylinder.

5. The improved brake shoe assembly of claim 1 wherein each of said plurality of extensions includes a first edge, a second edge, and a base secured to said cylindrically curved brake shoe platform, said first edge, said second edge, and said base defining a triangle.

6. The improved brake shoe assembly of claim 5 wherein said base is integrally formed with said cylindrically curved brake shoe platform, said base defining a bending axis.

7. The improved brake shoe assembly of claim 1 wherein said plurality of extensions define at least two circumferential rows symmetrically disposed on opposite sides of a circumferential centerline of said cylindrically curved brake shoe platform.

8. The improved brake shoe assembly of claim 1 wherein each of said plurality of extensions is disposed on a unique circumferential arc of said cylindrically curved brake shoe platform.

9. The improved brake shoe assembly of claim 1 wherein said plurality of extensions define at least one pattern symmetrical about a circumferential centerline of said cylindrical curved brake shoe platform.

* * * * *